United States Patent
Borg

(10) Patent No.: US 8,654,192 B2
(45) Date of Patent: Feb. 18, 2014

(54) INTER-IMAGE EFFECT ARRAY FOR PREVIEWING DIGITAL MOTION PICTURE CONTENT

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1868 days.

(21) Appl. No.: 11/842,630

(22) Filed: Aug. 21, 2007

(65) Prior Publication Data

US 2013/0120558 A1   May 16, 2013

(51) Int. Cl.
*H04N 5/253* (2006.01)
*G03B 27/50* (2006.01)
*G09G 5/00* (2006.01)
*G09G 5/02* (2006.01)
*G06K 9/00* (2006.01)

(52) U.S. Cl.
USPC ............... 348/96; 355/38; 345/581; 345/603; 382/167

(58) Field of Classification Search
USPC .......................................................... 348/96
See application file for complete search history.

(56) References Cited

U.S. PATENT DOCUMENTS

| | | | |
|---|---|---|---|
| 4,839,721 A | 6/1989 | Abdulwahab et al. | |
| 4,992,861 A | 2/1991 | D'Errico | |
| 4,999,668 A * | 3/1991 | Suzuki et al. | 355/38 |
| 5,057,913 A | 10/1991 | Nagata et al. | |
| 5,140,414 A | 8/1992 | Mowry | |
| 5,255,083 A | 10/1993 | Capitant et al. | |
| 5,457,491 A | 10/1995 | Mowry | |
| 5,641,596 A | 6/1997 | Gray et al. | |
| 5,841,512 A | 11/1998 | Goodhill | |
| 6,014,165 A | 1/2000 | McIntyre et al. | |
| 6,075,887 A | 6/2000 | Brett | |
| 6,864,915 B1 | 3/2005 | Guimares et al. | |
| 7,053,927 B2 | 5/2006 | Jones et al. | |
| 7,239,744 B2 * | 7/2007 | Arazaki | 382/167 |
| 2002/0118211 A1 * | 8/2002 | Figueroa et al. | 345/603 |
| 2004/0100473 A1 * | 5/2004 | Grzeszczuk et al. | 345/581 |
| 2007/0189381 A1 | 8/2007 | Borg | |

* cited by examiner

*Primary Examiner* — Christopher S Kelley
*Assistant Examiner* — Hee-Yong Kim
(74) *Attorney, Agent, or Firm* — Wolfe-SBMC

(57) ABSTRACT

The subject matter disclosed herein relates to calculating an inter-image effect array capable of tuning an effect of spectral dye density curves for use in a preview of digital motion picture content.

27 Claims, 12 Drawing Sheets

INTER-IMAGE EFFECT ARRAY FOR PREVIEWING DIGITAL MOTION PICTURE CONTENT

BACKGROUND

As computer systems are becoming more powerful, they may increasingly be used for computationally intensive image-processing tasks. Specifically, the motion picture industry may increasingly rely on computer systems to modify and preview films.

FIG. 1 presents a flowchart that illustrates a digital motion picture workflow.

A typical digital motion picture workflow begins when scene 102 may be captured on negative film 104 by a camera. Next, the camera's negative film 104 may be scanned to produce digital picture file 106. Digital picture file 106 may be encoded in a number of file formats. For example, the digital picture file may be a DPX/Cineon file (Digital Picture Exchange).

Digital picture file 106 may then be edited on a computer system and recorded onto negative film 110. Next, negative film 110 may be processed to produce positive print film 112. Finally, positive print film 112 may be used to project an image in a theatre by projecting it on theatre (or cinema) screen 114.

Editing a digital picture file 106 on a computer system may adversely affect the appearance of the edited scenes when they are projected on theatre screen 114. Specifically, scenes or special effects added to digital picture file 106, or manipulated during the editing process, may not match the look and feel of unedited scenes when they are projected on theatre screen 114.

Digital picture file 106 may be used to generate preview 108 of the digital motion picture as it may appear on the theatre screen 114. Some techniques may use a look-up table to convert input pixel values in digital picture file 106 to output pixel values that correspond to images appearing on theatre screen 114.

Typically, prior art techniques may use empirical techniques to generate the look-up table. A special digital picture file 106 that contains a number of color patches may be developed and projected onto a theatre screen. Next, the color of a region in the projected picture may be compared with the color of the corresponding region in digital picture file 106 to determine the value of the corresponding entry in the look-up table.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
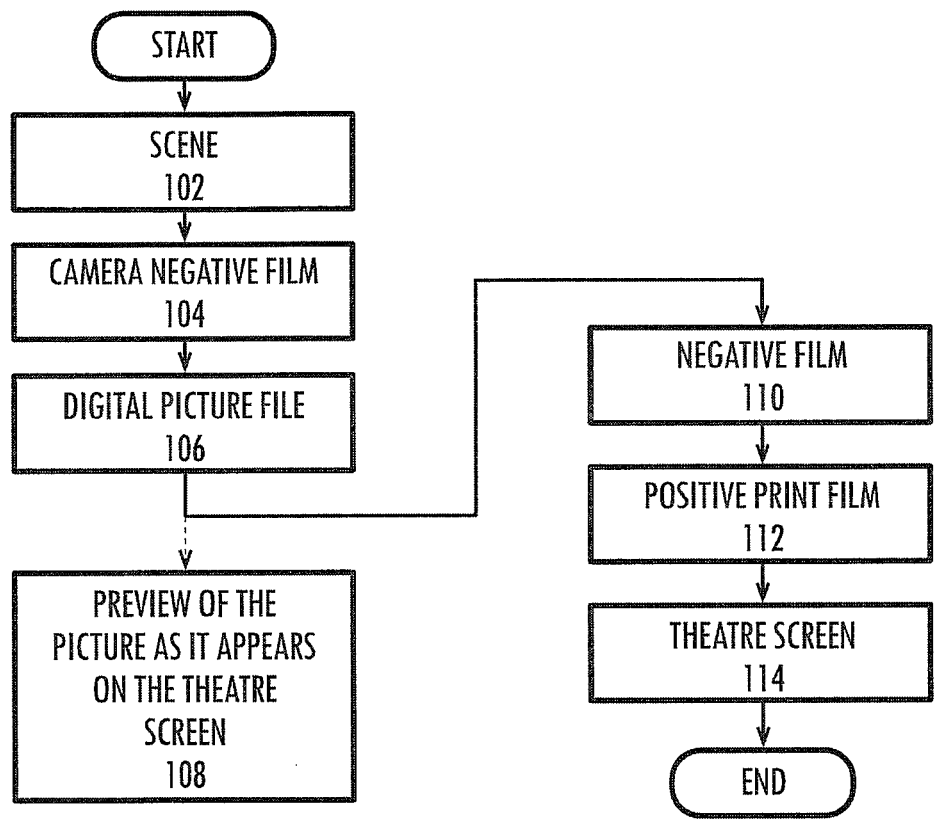
FIG. 1 presents a flowchart that illustrates a digital motion picture workflow.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. However, these are merely examples of an instruction, and the scope of claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

The term "substrate" as referred to herein may refer to a material or medium for capturing information representative of visual images, although the scope of claimed subject matter is not limited in this respect. For example, term "substrate" as referred to herein may include, but is not limited to, film and/or the like.

As will be described in greater detail below, in one particular example, although claimed subject matter is not limited in this respect, an analytical model may be used to preview a motion picture as it will appear on a theatre screen so that discrepancies may be fixed before the film is developed. In one embodiment, a look-up table may be generated based at least in part on such an analytical model, where the look-up table may be used to preview a motion picture. Such an analytical model may permit a decrease in and/or eliminate use of the time consuming and labor intensive process of developing a color patch picture before a look-up table may be determined. In another embodiment, such an analytical model may avoid variable results that may be caused by the film development process, where such variable results may adversely affect the accuracy of the look-up table. In a further embodiment, such an analytical model described herein may increase accuracy by avoiding instrument noise affecting measured values, especially in dark patches. In a still further embodiment, such an analytical model described herein may allow for increased flexibility in modifying motion picture workflow (e.g., if even one of the stages in the motion picture workflow may be modified, an entire film development process may not have to be repeated to generate a new look-up table that captures the effect of the modified workflow.

Additionally or alternatively, as will be described in greater detail below, in one particular example, although claimed subject matter is not limited in this respect, an inter-image effect array may be determined and incorporated into an analytical model. The term "inter-image effect" as referred to herein relates to a form of cross talk between color channels represented in a photographic film. The term "inter-image effect array" as referred to herein relates to an array capable of tuning an effect of spectral dye density curves. Such an inter-image effect array may be capable of augmenting and/or correcting an effect of spectral dye density curves within an analytical model . . . . As will be described in greater detail below, spectral dye density curves may operate to inverse transmittance of a film as a function of light wavelength. However, spectral dye density curves may be valid only at intermediate densities near neutral, and may have decreased validity for saturated colors. Further, spectral dye density curves may not quantify any or all inter-image effects. Accordingly, use of spectral dye density curves within an analytical model may result in estimation errors in response to saturated colors. In one particular example, although claimed subject matter is not limited in this respect, an inter-image effect array capable of tuning an effect of spectral dye density curves may be determined and incorporated into an analytical model. Such an inter-image effect array may be utilized to augment and/or correct published spectral dye density curves used in an analytical model.

Characteristic Curves

As will be described in greater detail below, in one particular example, although claimed subject matter is not limited in this respect, an analytical model may utilize one or more characteristic curves. A characteristic curve may plot a relationship between an amount of exposure that may be given to a photographic film and a corresponding density value after processing the film. Such density values may be measured on a film test strip that may be exposed in a densitometer under carefully controlled conditions, and processed under equally controlled conditions.

A range of densities in a test strip may simulate many picture taking situations. An amount of exposure (measured in lux) received by individual steps on the test strip may be multiplied by the exposure time (measured in seconds) to produce exposure values (measured in units of lux-seconds). The logarithms (base 10) of the exposure values may be plotted on a horizontal scale to produce a characteristic curve. This characteristic curve may also be known as a sensitometric curve, a D Log H curve, or an H & D (Hurter and Driffield) curve. Multiple characteristic curves may be associated with for a color photographic film, such as for example, one characteristic curve for each color channel.

Figure 2:
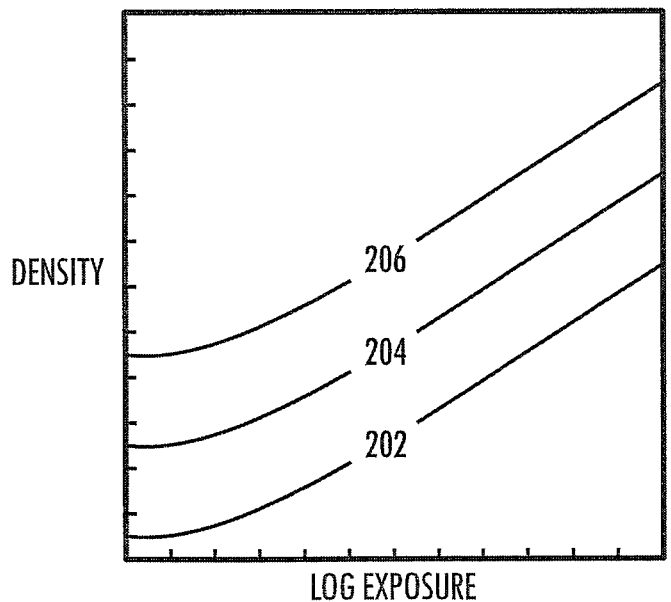
FIG. 2 illustrates characteristic curves for a color negative film in accordance with one or more embodiments.

FIG. 2 illustrates characteristic curves for a color negative film in accordance with one or more embodiments, although the scope of claimed subject matter is not limited in this respect. Characteristic curves 202, 204, and 206 illustrate exemplary characteristic curves for a red modulating dye layer (cyan colored), green modulating dye layer (magenta colored), and blue modulating dye layer (yellow colored), respectively. Regardless of film type, characteristic curves may have five regions: a D-min (minimum density), a toe, a straight-line portion, a shoulder and a D-max (maximum density).

In color negatives, a base density (or D-min) value may correspond to a minimum exposure for recording a change in the density of the negative film. In other words, base density may be the density of a fixed-out (all silver removed) negative or positive film that may be neither exposed nor developed. Net densities produced by exposure and development may be measured from the base density.

A toe portion may correspond to a portion of the characteristic curve where the slope (or gradient) increases gradually with constant changes in exposure. A straight-line portion may correspond to a portion of the curve where the slope does not change. To achieve desirable results, significant picture information may be placed on a straight-line portion. A shoulder portion may correspond to a portion of the curve where the slope decreases. Exposures beyond a maximum density (D-max) may not increase the density of the film.

Status Densitometry

Characteristic curves for a test film exposed and processed as described above may be the "absolute" or "real" characteristic curve of a particular film processed using a particular processing technology, which may be empirically determined from a plurality of actual exposures. For example, the "absolute" or "real" characteristic curve of a particular film processed using a particular processing technology may be empirically determined from 20 or more actual exposures at density increments of 0.15. However, densitometers may be compared with one another to establish that the values produced by one densitometer are comparable to those produced by another one. Status densitometry may be used to achieve this standardization. Status densitometry may refer to measurements made on a densitometer that conform to a specific spectral response.

Densities of positive films may be measured by Status A densitometry using a standard set of carefully matched filters. Likewise, densities of negative films may be measured by Status M densitometry which uses a different set of carefully matched filters. Such densitometer filter sets may be provided by manufacturers of densitometers.

Spectral Sensitivity Curves

Spectral sensitivity, as referred to herein, may relate to relative sensitivity of an emulsion to a spectrum of radiation (or light) within the film's sensitivity range. A spectral sensitivity of a color film may include multiple associated spectral sensitivity curves, such as for example, one spectral sensitivity curve for each color channel.

Spectral sensitivity curves may be generated by exposing a color film to radiation (or light) of specific wavelengths and measuring a resulting sensitivity response. Wavelength of the light may be expressed in nanometers and the sensitivity may be expressed as the reciprocal of the exposure (ergs/cm$^2$) that may be required to produce a specific density. The wavelength of the light may be plotted along an X-axis, and the logarithm of sensitivity may be plotted along a Y-axis.

Figure 3:
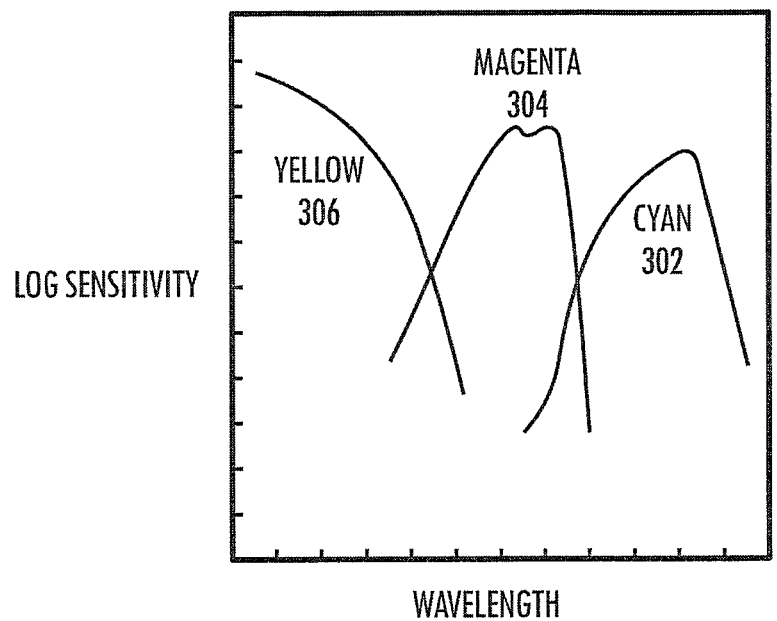
FIG. 3 illustrates the spectral sensitivity curves for a color negative film in accordance with one or more embodiments.

FIG. 3 illustrates spectral sensitivity curves of a color negative film in accordance with one or more embodiments, although the scope of claimed subject matter is not limited in this respect. Exemplary spectral sensitivity curves 302, 304, and 306 may correspond to red-sensitive (cyan-dye forming), green-sensitive (magenta-dye forming), and blue-sensitive (yellow-dye forming) emulsion layers, respectively.

Spectral Dye Density Curves

Processing exposed color film may produce cyan, magenta, and yellow dye images in three separate layers of film, for example. Spectral dye density curves may indicate absorption of light by each color dye at different wavelengths. Spectral dye density curves may represent dyes normalized to form a visual neutral density of 1.0 for a specified viewing and/or measuring illuminant. The light wavelengths (e.g., in manometers) may be plotted along an X-axis, and associated spectral densities may be plotted on a Y-axis. A color dye may absorb substantially only in its own region of the spectrum. However, any color dye may absorb some wavelengths in other regions of the spectrum.

Figure 4:
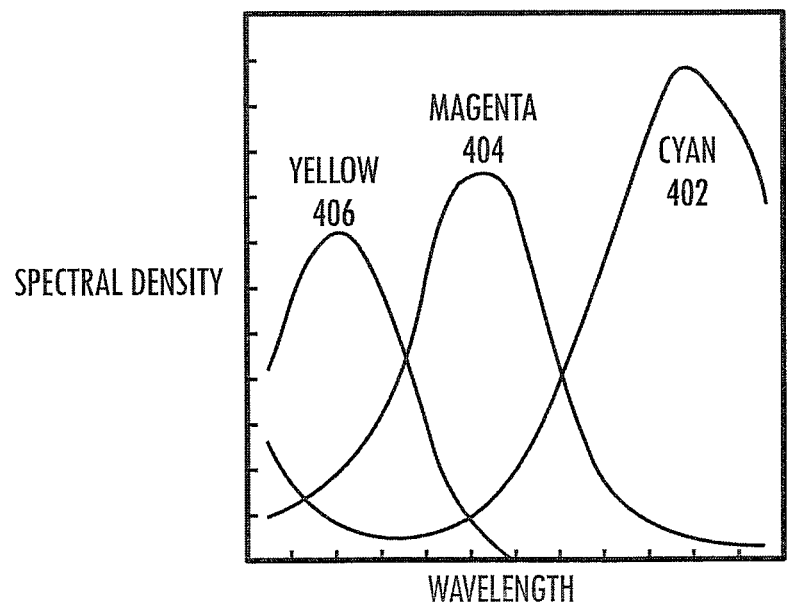
FIG. 4 illustrates the spectral dye density curves for a color negative film in accordance with one or more embodiments.

FIG. 4 illustrates spectral dye density curves for a color negative film in accordance with one or more embodiments, although the scope of claimed subject matter is not limited in this respect. Exemplary spectral dye density curves 402, 404, and 406 may correspond to cyan, magenta, and yellow dyes, respectively.

Laboratory Aim Density (LAD)

Laboratory Aim Density (LAD) printing control techniques may allow calibration of film processing equipment, such as for example, printers, recorders, and/or the like. For example, LAD printing control techniques may allow calibration of film processing equipment so as to accurately reproduce the desired colors in a picture. Specifically, for a negative color film, a standard control patch may specify densities midway between the minimum and maximum of those obtained for a normal camera exposure. These color patches may be used to calibrate film processing equipment. As is described below in greater detail, LAD data may be used to calibrate characteristic curves for a color film.

Analytical Model for a Motion Picture Workflow

Figure 5:
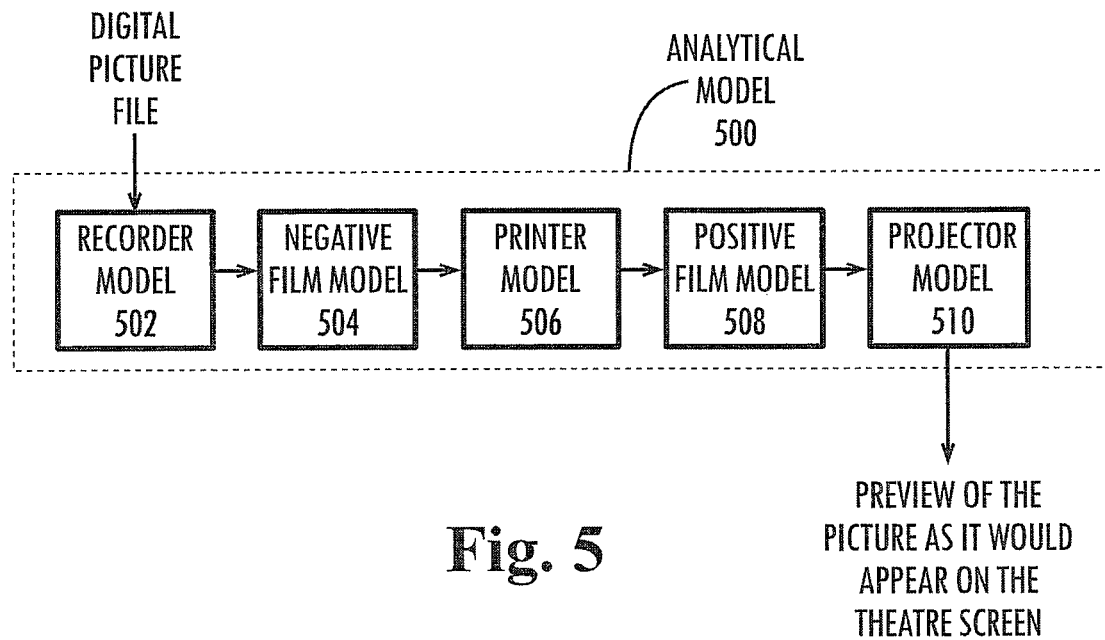
FIG. 5 presents a block diagram that illustrates an analytical model for a motion picture workflow in accordance with one or more embodiments.

FIG. 5 presents a block diagram that illustrates an analytical model for a motion picture workflow in accordance with one or more embodiments, although the scope of claimed subject matter is not limited in this respect. Analytical model 500 for a motion picture workflow may comprise components capable of modeling stages in a motion picture workflow.

For example, recorder model 502 may model behavior of a recorder as it records visual information expressed and/or represented in a digital picture file onto a color negative film. For example, a color recorder may generate light by modulating a red, green, and blue laser based at least in part on the pixel values in the digital picture file.

In one particular example, although claimed subject matter is not limited in this respect, recorder model 502 may determine spectral characteristics of light generated by a recorder based at least in part on the input pixel values. In other words, recorder model 502 may determine a power spectrum of light generated by the recorder based at least in part on the pixel values in the digital picture file.

Figure 6:
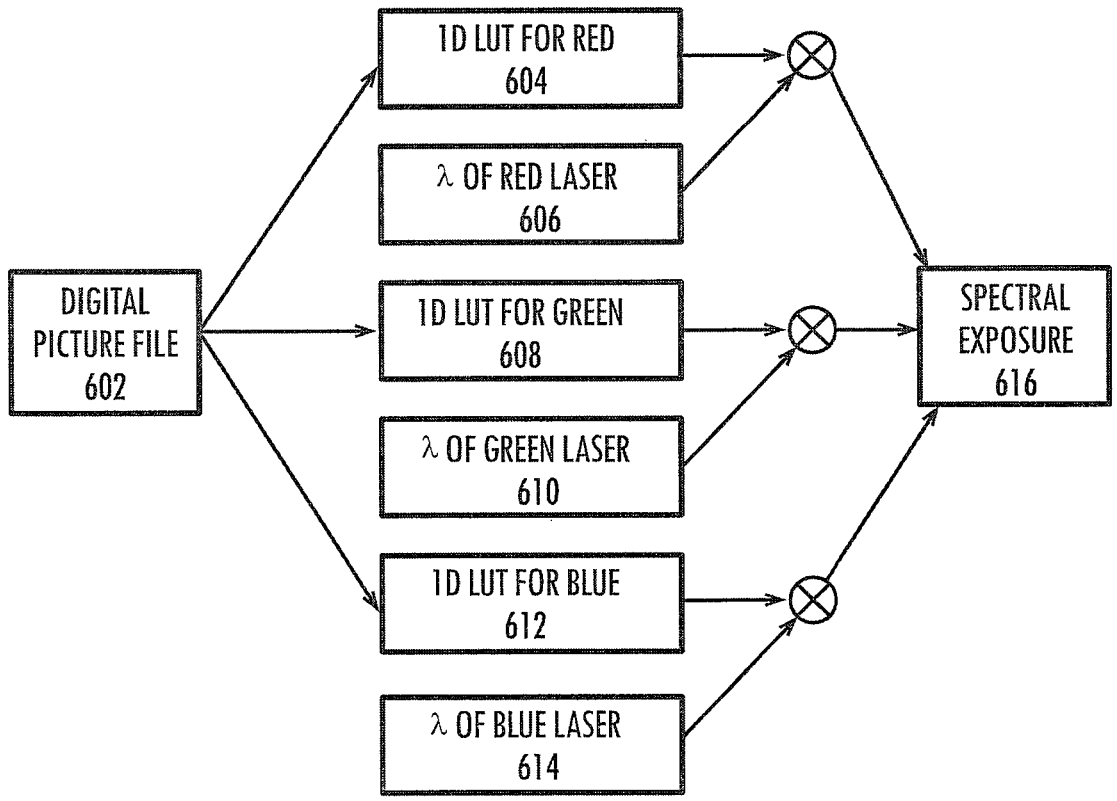
FIG. 6 illustrates a recorder model in accordance with one or more embodiments.

FIG. 6 illustrates a recorder model in accordance with one or more embodiments, although the scope of claimed subject matter is not limited in this respect. Each pixel in digital picture file 602 may be associated with a red, green, and blue color channel value. These color channel values may be used to determine modulation amounts for red laser 606, green laser 610, and blue laser 614. As discussed above, a color recorder may generate light by modulating a red, green, and blue laser, where the quantity of light generated may be referred to herein as a modulation amount. Specifically, the 1-dimension look-up tables 604, 608, and 612 may be used to determine input required to achieve a given density, such as modulation amounts for the red, green, and blue lasers, respectively. These modulation amounts may determine intensity of the lasers, which, in turn, may affect dye densities in a negative film. In one particular example, although claimed subject matter is not limited in this respect, 1-dimension look-up tables 604, 608, and 612 may be calibrated so that a standardized pixel value may generate a standardized dye density in the negative film.

Referring back to FIG. 5, negative film model 504 may model behavior of color negative film in response to exposure to light by the recorder. Recall that as discussed above recorder model 502 may be used to determine a power spectrum of light incident on color negative film. Further, recall that a color negative film may respond to a spectral exposure according to its characteristic curves. Hence, dye densities may be determined based at least in part on a power spectrum of the incident light and characteristic curves. Further, each dye may be associated with a spectral dye density curve. Hence, based at least in part on the dye densities and the spectral dye density curves, a spectral transmittance of the color negative film may be determined.

In other words, negative film model 504 may determine a spectral transmittance of a negative film based at least in part on a power spectrum of a recorder's light. Each pixel in the digital picture file may be associated with a region in the color negative film which, in turn, may be associated with a spectral transmittance.

Figure 7:
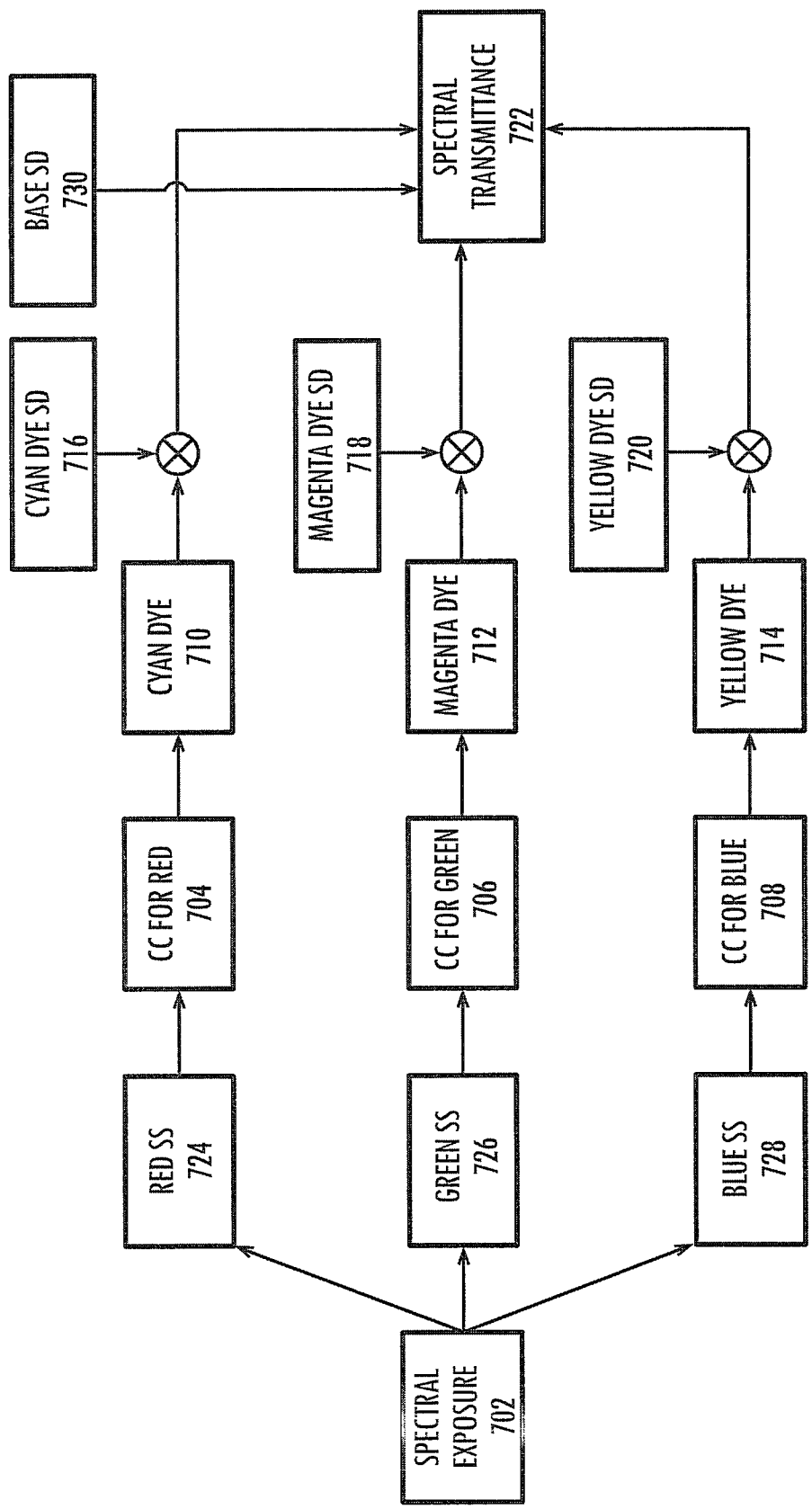
FIG. 7 illustrates a negative film model in accordance with one or more embodiments.

FIG. 7 illustrates a negative film model in accordance with one or more embodiments, although the scope of claimed subject matter is not limited in this respect. Spectral exposure 702 may specify a power spectrum of incident light. Recall that a dye may respond to the spectral exposure according to an associated spectral sensitivity curve. Accordingly, spectral exposure 702 may be modified based at least in part on spectral sensitivity to find an effective exposure. Hence, the effective exposures for the cyan, magenta, and yellow dyes may be determined based at least in part on spectral exposure 702 and a red spectral sensitivity 724, green spectral sensitivity 726, and blue spectral sensitivity 728, respectively. A cyan dye amount 710, magenta dye amount 712, and the yellow dye amount 714 may then be determined based at least in part on the effective spectral exposures and the color negative film's characteristic curves for red 704, green 706, and blue 708, respectively. Once the cyan 710, magenta 712, and yellow 714 dye amounts are known, a spectral transmittance 722 of the color negative film may be determined based at least in part on a base spectral density 730, and dye spectral density curves for cyan 716, magenta 718, and yellow 720, respectively.

In one particular example, although claimed subject matter is not limited in this respect, a recorder and a negative film may be calibrated so that the output values from associated 1-dimension look-up tables for the lasers, namely, 604, 608, and 612, may be directly used as the cyan dye amount 710, magenta dye amount 712, and yellow dye amount 714, respectively.

Referring back to FIG. 5, printer model 506 may model the behavior of a printer which prints visual information expressed and/or represented in color negative film onto a color positive film. Specifically, printer model 506 may determine a power spectrum of a printer's light that may be used to print the negative film. Once a printer's light's power spectrum and a negative film's spectral transmittance are known, the power spectrum of the light that may be incident on the color positive film may be determined by taking the product of the printer's light's power spectrum and the negative film's spectral transmittance.

Figure 8:
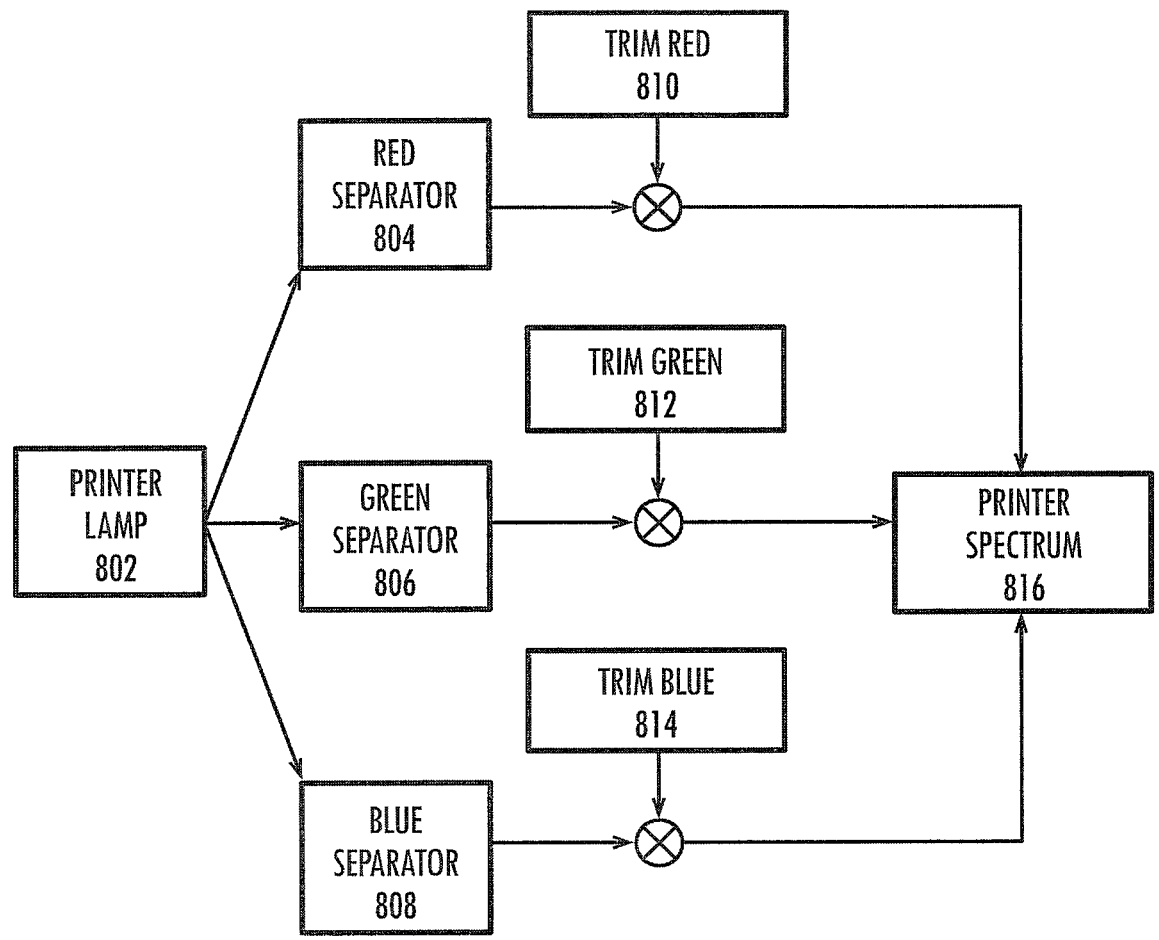
FIG. 8 illustrates a printer model in accordance with one or more embodiments.

FIG. 8 illustrates a printer model in accordance with one or more embodiments, although the scope of claimed subject matter is not limited in this respect. Light from printer lamp 802 may be separated into red, green, and blue components based at least in part on red separator 804, green separator 806, and blue separator 808, respectively. A color separator may comprise a type of a filter, such as a dichroic mirror. Next, these color components may be further modulated based at least in part on red trim 810, green trim 812, and blue trim 814. Red, green, and blue trims may be calibrated so that they generate LAD densities on the print film. Finally, modulated color components may be added to produce the printer's spectrum 816.

Referring back to FIG. 5, positive film model 508 may model behavior of a color positive film in response to the color positive film being exposed to a printer's light. Recall that as described above printer model 506 and a negative film's spectral transmittance may be used to determine the power spectrum of the light incident on color positive film. Further, recall that a color positive film may respond to a spectral exposure according to its characteristic curves. Hence, associated dye densities may be determined based at least in part on a power spectrum of incident light and characteristic curves. Each dye may be associated with a spectral dye density curve. Hence, based at least in part on dye densities and spectral dye density curves, spectral transmittance of a color positive film may be determined.

In other words; positive film model 508 may determine a spectral transmittance of positive film based at least in part on a power spectrum of incident light. Each pixel in the digital picture file may be associated with a region in the color positive film which, in turn, may be associated with a spectral transmittance.

Figure 9:
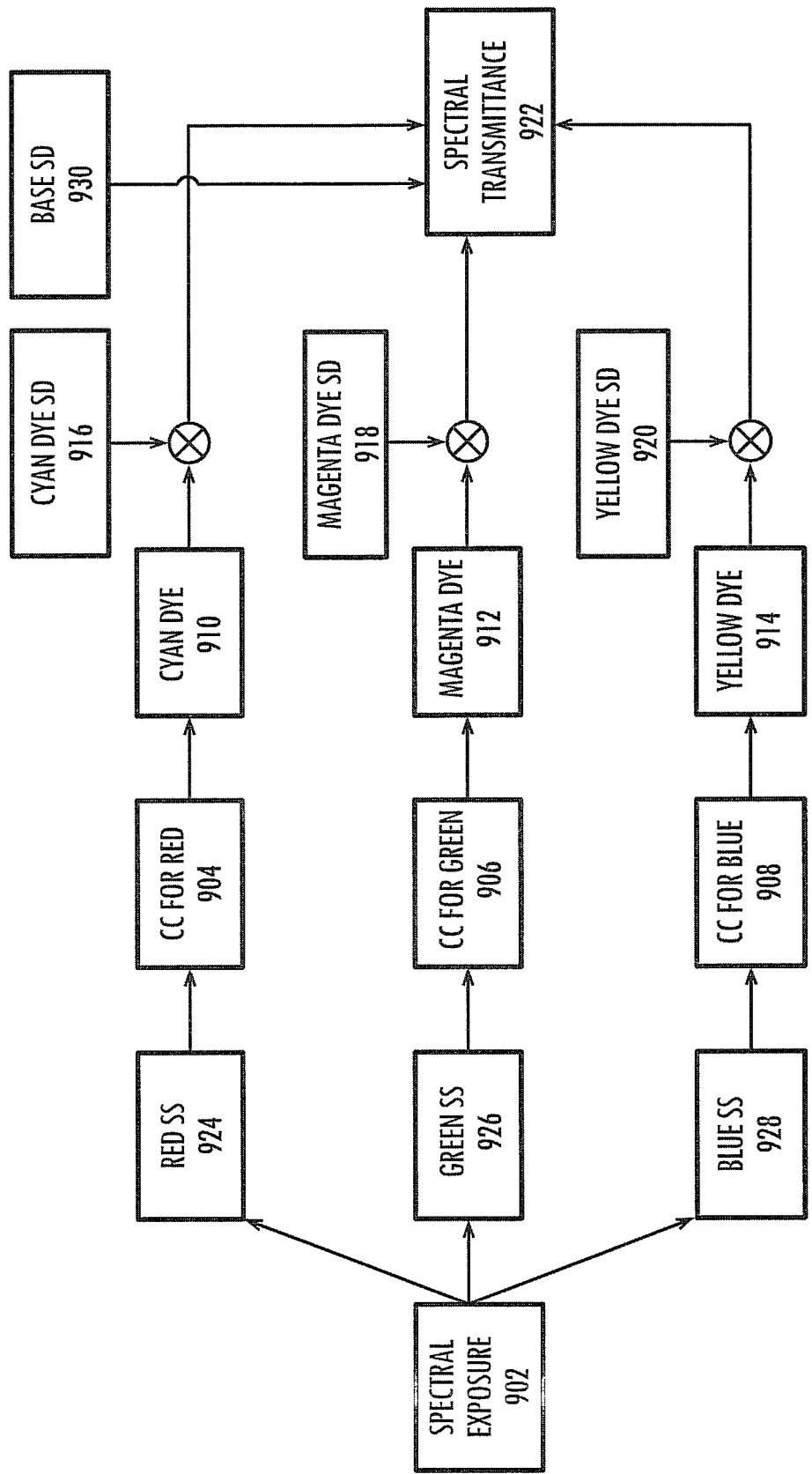
FIG. 9 illustrates a positive film model in accordance with one or more embodiments.

FIG. 9 illustrates a positive film model in accordance with one or more embodiments, although the scope of claimed subject matter is not limited in this respect. Spectral exposure 902 may specify a power spectrum of the incident light. Recall that a dye responds to the spectral exposure according to its spectral sensitivity curve. Accordingly, spectral exposure 902 may be modified based at least in part on spectral sensitivity to find an effective exposure. Hence, effective exposures for the cyan, magenta, and yellow dyes may be determined based at least in part on spectral exposure 902 and red spectral sensitivity 924, green spectral sensitivity 926, and blue spectral sensitivity 928, respectively. A cyan dye amount 910, magenta dye amount 912, and yellow dye amount 914 may then be determined based at least in part on effective spectral exposures and a color positive film's characteristic curves for red 904, green 906, and blue 908, respectively. Once cyan 910, magenta 912, and yellow 914 dye amounts are known, a spectral transmittance 922 of color positive film may be determined based at least in part on base spectral density 930, and dye spectral density curves for cyan 916, magenta 918, and yellow 920, respectively.

Referring back to FIG. 5, projector model 510 may model the behavior of a film projector as it projects the positive film on a theatre (or cinema) screen. Specifically, projector model 510 may determine a spectral power distribution of the projector's light that may be used to display the picture on the theatre screen. Once a projector's light's power spectrum and the positive film's spectral transmittance are determined, the spectral power distribution on the theatre screen may then be determined.

In other words, projector model 510 may determine a spectral power distribution on a theatre screen based at least in part on spectral transmittance of a color positive (or print) film. Each pixel in the digital picture file may be associated with a region on the theatre screen which, in turn, may be associated with a spectral power distribution.

Figure 10:
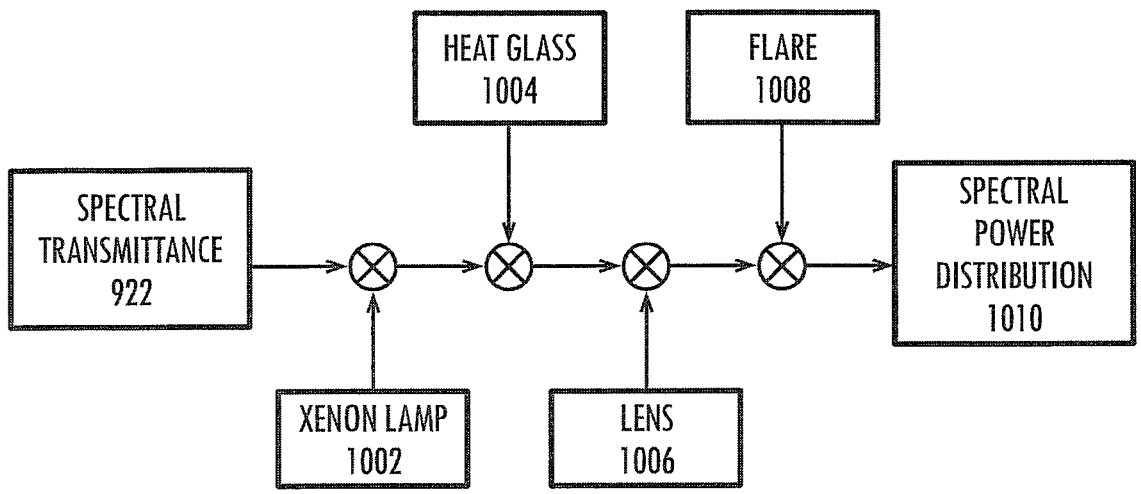
FIG. 10 illustrates a projector model in accordance with one or more embodiments.

FIG. 10 illustrates a projector model in accordance with one or more embodiments, although the scope of claimed subject matter is not limited in this respect. A power spectrum of the projector's light may be determined by modulating the xenon lamp 1002 by heat glass coefficient 1004 and lens coefficient 1006, and adding the contribution of flare 1008. Next, a spectral power distribution on the theatre screen 1010 may be determined based at least in part on a spectral transmittance of positive color film 922 and a power spectrum of the projector's light.

An analytical model may not be limited to a particular color space or file format. In one particular example, although claimed subject matter is not limited in this respect, the input digital picture file may be in DPX (Digital Picture Exchange) format, whereas the output preview may be in CIELAB (Commission Internationale d'Eclairage (L*, a*, b*)) color space. However, it will be apparent to one skilled in the art that other file formats and/or color spaces may also be used in the analytical model.

Process for Determining Characteristic Curves

Characteristic curves for the dye amounts (704, 706, 708, 904, 906, and 908) may be an important part of analytical models shown in FIG. 7 and FIG. 9. Characteristic curves may be available from the manufacturers. However, in instances where characteristic curves may not be available from the manufacturers, these characteristic curves may need to be determined based at least in part on the available information.

Status M (or Status A) characteristic curves, which may be available from the manufacturers, specify density values over a range of exposure levels for a light source that has a specified spectral pattern. However, Status M (or Status A) characteristic curves may not specify actual dye amounts. Actual dye amounts may be determined so that the spectral transmittance of a film in response to exposure using a light source with an arbitrary spectral pattern may be accurately determined.

In one particular example, although claimed subject matter is not limited in this respect, characteristic curves for color channels may be determined based at least in part on Status M (or Status A) characteristic curves, spectral dye density curves, and an associated pixel value that produces an associated dye density.

Figure 11:
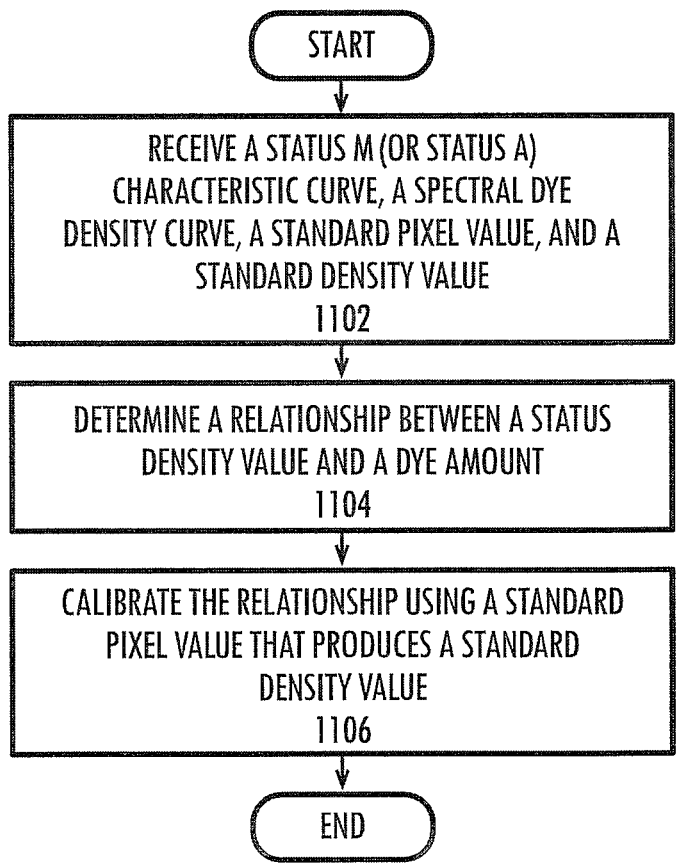
FIG. 11 presents a flowchart that illustrates a process for determining a characteristic curve that may accurately determine a dye density in a film in response to the film being exposed using a light source with an arbitrary spectral pattern in accordance with one or more embodiments.

FIG. 11 presents a flowchart that illustrates a process for determining a characteristic curve that may accurately determine a dye density in a film in response to the exposure of the film using a light source with an arbitrary spectral pattern in accordance with one or more embodiments, although the scope of claimed subject matter is not limited in this respect. Although the procedure shown in FIG. 11 may comprise one particular order of blocks, the order in which the blocks are presented does not necessarily limit claimed subject matter to any particular order. Likewise, intervening blocks and/or additional blocks not shown in FIG. 11 may be employed and/or blocks shown in FIG. 11 may be eliminated, without departing from the scope of claimed subject matter.

The process shown in FIG. 11 may begin by receiving a Status M (or Status A) characteristic curve, a spectral dye density curve, an associated pixel value, and an associated density value (step 1102). Next, the system may determine a relationship between a status density value and a dye amount based at least in part on the spectral dye density curve (step 1104).

In one particular example, although claimed subject matter is not limited in this respect, a relationship between a status density value and a dye amount may be represented by a mathematical expression. Specifically, this relationship may be determined by solving for a dye amount which results in a target Status M (or Status A) density value based at least in part on the dye density curves. Note that, in its present form, such a relationship may not be able to determine an actual dye amount based at least in part on an actual exposure level because the relationship may not have been calibrated as yet.

The system may then calibrate such a relationship based at least in part on an associated pixel value which may produce an associated density value (step 1106). The calibrated relationship may be represented by the characteristic curve that is being determined. Further, the calibrated relationship may determine an actual dye amount based at least in part on an actual exposure level.

In one particular example, although claimed subject matter is not limited in this respect, a system may calibrate such a relationship based at least in part on associated DPX (Digital Picture Exchange) pixel value 445 which may produce associated Status M (or Status A) LAD densities as specified by the film manufacturer.

Process for Determining Inter-Image Effect Array

Figure 9A:
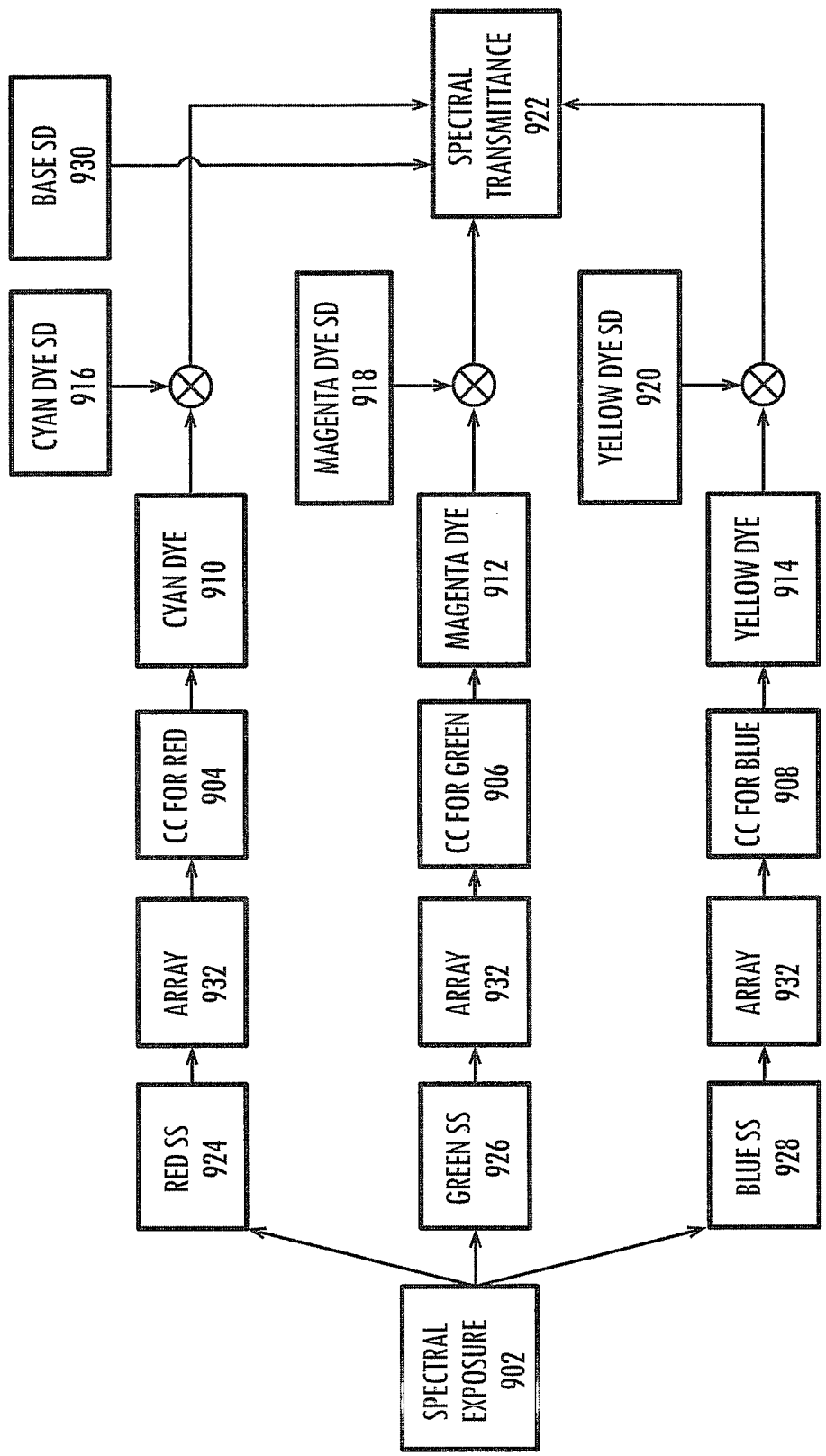
FIG. 9A illustrates a positive film model incorporating an inter-image effect array capable of tuning an effect of spectral dye density curves in accordance with one or more embodiments.

FIG. 9A illustrates a positive film model incorporating an inter-image effect array capable of tuning an effect of spectral dye density curves in accordance with one or more embodiments, although the scope of claimed subject matter is not limited in this respect. As described above in FIG. 9, spectral dye density curves 916, 918, and 920 may be used in an analytical model. Spectral dye density curves 916, 918, and 920 may operate to inverse transmittance of a film as a function of light wavelength, and may be obtained from published specifications. However, published spectral dye density curves 916, 918, and 920 may be valid only at intermediate densities near neutral, and may have decreased validity for saturated colors. Further, published spectral dye density curves 916, 918, and 920 may not quantify any or all inter-image effects. The term "inter-image effect" as referred to herein relates to a form of cross talk between color channels within the film. Accordingly, use of published spectral dye density curves 916, 918, and 920 within the analytical model may result in estimation errors in response to saturated colors.

In one particular example, although claimed subject matter is not limited in this respect, an inter-image effect array 932 capable of tuning an effect of spectral dye density curves may be determined and incorporated into an analytical model. Inter-image effect array may be utilized to augment and/or correct published spectral dye density curves 916, 918, and 920 used in an analytical model. For example, inter-image effect array 932 may be utilized to increase the accuracy of an analytical model where saturated colors may be being modeled. Additionally or alternatively, inter-image effect array 932 may be utilized to increase the accuracy of an analytical model where an inter-image effect may occur within the film.

Inter-image effect array 932 may be utilized in the positive film model 508 illustrated in FIG. 5. As illustrated here in FIG. 9A, inter-image effect array 932 may be applied to RGB print film exposure data of spectral exposure 902 after application of red spectral sensitivity 924, green spectral sensitivity 926, and blue spectral sensitivity 928. For example, spectral exposure 902 may be modified based at least in part on spectral sensitivity to find a captured exposure. Such a captured exposure for a channel may be determined by a dot product of spectral exposure 902 and the spectral sensitivity for a given color channel, such as for example, red spectral sensitivity 924, green spectral sensitivity 926, and/or blue spectral sensitivity 928, For example, after determining captured exposures based at least in part on application of red spectral sensitivity 924, green spectral sensitivity 926, and blue spectral sensitivity 928 to spectral exposure 902, RGB print film captured exposure data of spectral exposure 902 may be converted to log RGB print film captured exposure data. Inter-image effect array 932 may then be applied to the log RGB print film captured exposure data prior to the application of characteristic curves for red 904, green 906, and blue 908. As described above, cyan dye amount 910, magenta dye amount 912, and yellow dye amount 914 may then be determined based at least in part on characteristic curves for red 904, green 906, and blue 908, respectively. Once cyan 910, magenta 912, and yellow 914 dye amounts are known, spectral transmittance 922 of color positive film may be determined based at least in part on base spectral density 930, and dye spectral density curves for cyan 916, magenta 918, and yellow 920, respectively.

Figure 14:
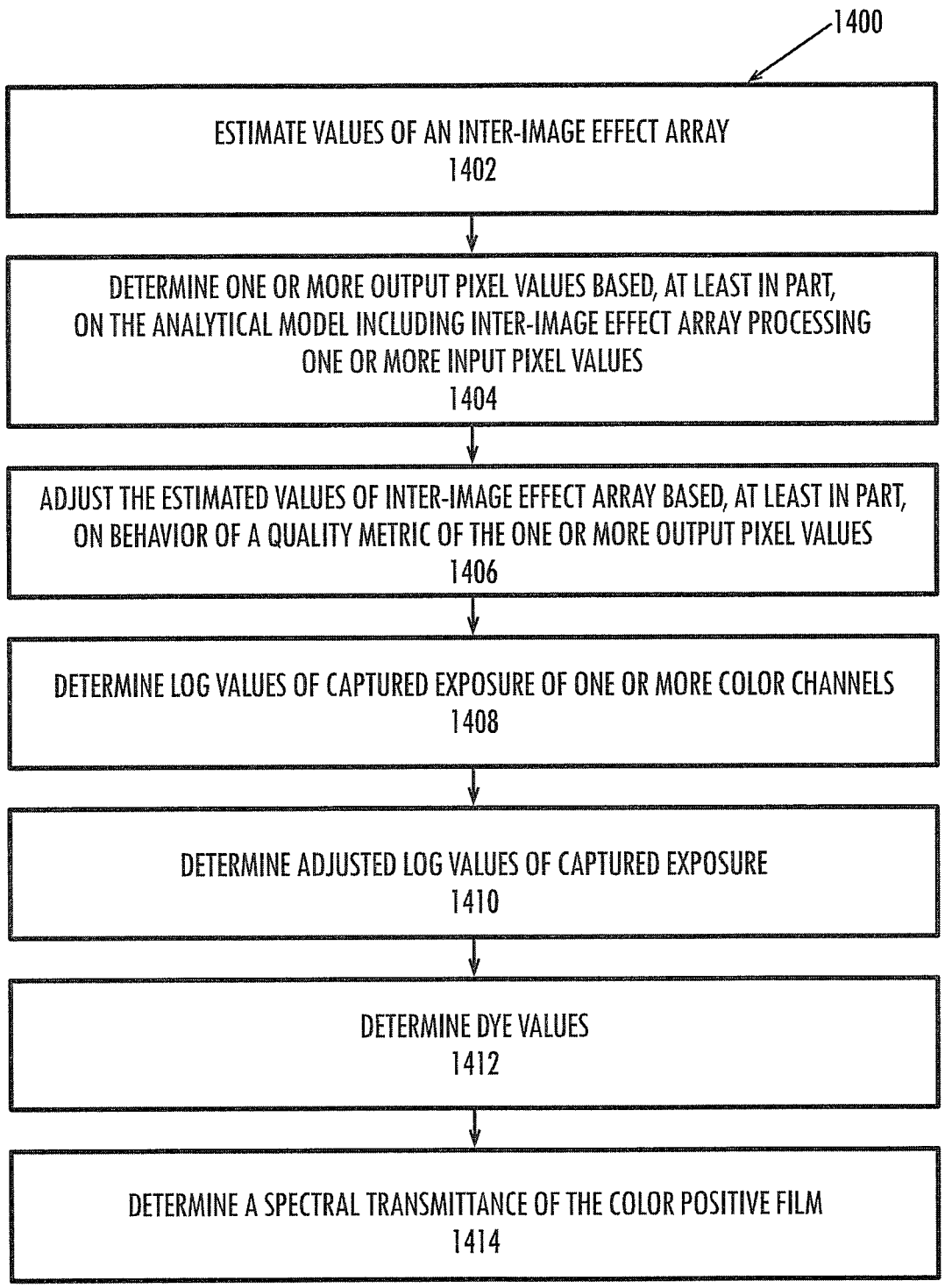
FIG. 14 presents a flowchart that illustrates a process for determining an inter-image effect array capable of tuning an effect of spectral dye density curves in accordance with one or more embodiments.

FIG. 14 presents a flowchart that illustrates a process for determining an inter-image effect array capable of tuning an effect of spectral dye density curves in accordance with one or more embodiments, although the scope of claimed subject matter is not limited in this respect. Although the procedure shown in FIG. 14 may comprise one particular order of blocks, the order in which the blocks are presented does not necessarily limit claimed subject matter to any particular order. Likewise, intervening blocks and/or additional blocks not shown in FIG. 14 may be employed and/or blocks shown in FIG. 14 may be eliminated, without departing from the scope of claimed subject matter.

Procedure 1400 illustrated in FIG. 14 may be used to determine an inter-image effect array capable of tuning an effect of spectral dye density curves, for example, although the scope of claimed subject matter is not limited in this respect. Procedure 1400 may in alternative embodiments be implemented in software, hardware, and/or firmware, and may comprise discrete operations. As illustrated, procedure 1400 starts at block 1402 where values of an inter-image effect array 932 may be estimated. For example, values of an inter-image effect array 932 may be estimated based at least in part upon spectral dye density curves 916, 918, and 920. For example, estimated values of inter-image effect array 932 may be based at least in part upon a captured exposure of the substrate independent of cross-talk effects between one or more color channels represented in the substrate.

In one embodiment, inter-image effect array 932 may provide at least a portion of an analytical model of a digital picture workflow. Additionally or alternatively, inter-image effect array 932 may comprise a three-by-three matrix associated with three color channels from spectral exposure 902.

In one particular example, although claimed subject matter is not limited in this respect, inter-image effect array 932 may comprise a matrix (labeled here as logrgbCompensationMatrix) inserted in the step where the log exposure from negative film's DPX values (labeled here as log captured exposure) is converted into the print film's log RGB exposure values (labeled here as log adjusted exposure). The matrix may be applied in a log domain. Additionally, an offset (labeled here as LAD exposure) may be subtracted before application of the matrix and added back after the matrix so that LAD patches print the same regardless of the matrix values. A relationship between the print film's log RGB exposure values and the matrix may be represented by a mathematical expression, such as is illustrated for example in the following relation:

log adjusted exposure:=logrgbCompensationMatrix·
(log captured exposure−LAD exposure)+LAD
exposure The matrix may be initialized to an identity matrix.

At block 1404, one or more output pixel values may be determined based, at least in part, on an analytical model including inter-image effect array 932 processing one or more input pixel values. In one particular example, although claimed subject matter is not limited in this respect, one or more known pixel values may comprise measurements for a number of color patches from a theater. This measurement data may comprise pairs of DPX and Lab values. Each pair may map a DPX triplet to an associated Lab value for color projected in the theater. These pairs may be identified as aim DPX and aim Lab values. These pairs may be obtained by generating a set of images with DPX values, outputting these as actual film frames through a film production workflow (such as film production workflow illustrated in FIG. 1, for example), then projecting and measuring each patch in the theater. DPX values may be selected so that they are distributed across the full input space, and may include saturated colors of several hues. In cases where a large number of measurements are available, such as for example in the hundreds, then a 3DLUT may be created to approximate an analytical model during calculation of inter-image effect array 932.

At block 1406, estimated values of inter-image effect array 932 may be adjusted based at least in part on behavior of a quality metric associated with the one or more output pixel values. For example, an operation of determining one or more output pixel values may further comprise applying estimated values to log values of captured exposure of the substrate in one or more color channels represented in the substrate.

The term "quality metric" as referred to herein relates to a measurement capable of quantifying the accuracy of values determined by a mathematical model. For example, a quality metric may comprise a model error based at least in part on a comparison between at least one of the one or more output pixel values and one or more known pixel values. Accordingly, the operation of adjusting the estimated values of inter-image effect array 932 may further include adjusting estimated values based at least in part on a reduction in model error.

In one particular example, although claimed subject matter is not limited in this respect, one or more output pixel values may comprise model Lab values that may be calculated based at least in part on aim DPX values processed by an analytical model incorporating the matrix. A mean distance (labeled here as mean deltaE) between each aim Lab value and associated model Lab values may be calculated. Based at least in part on such a calculated mean distance, the matrix may be recalculated to reduce the mean deltaE. In one particular example, although claimed subject matter is not limited in this respect, for minimization, a series of offsets may be created, from (−n*increment) to (+n*increment), and where the increment may be selected to permit convergence. For example, n may be selected from 1, 2, and/or 3, and an increment of 0.08 and/or the like may be selected. Then, a position in the matrix may be selected. For each offset, a mean deltaE may be calculated for the matrix based on the offset applied in the selected position. The matrix may then be adjusted with the value that resulted in the lowest mean delta E. A next position in the matrix may be selected and the minimization process may be repeated for each position in the matrix until the retained adjusted matrix values don't change. The selected increment may then be updated with a smaller increment, such as for example by dividing the initial increment by 2. For example, an increment of 0.01 or the like may be selected. The resultant adjusted matrix may result in a reduced mean deltaE for a given set of color patches.

At block 1408, log values of captured exposure of one or more color channels may be determined. At block 1410, adjusted log values of captured exposure may be determined based at least in part on applying estimated values of inter-image effect array 932 to log values of the captured exposure. At block 1412, dye values may be determined based at least in part on applying one or more characteristic curves to adjusted log values of captured exposure. At block 1414, a spectral transmittance of the color positive film may be determined based at least in part on the dye values.

Process for Generating a Look-Up Table Using an Analytical Model

Figure 12:
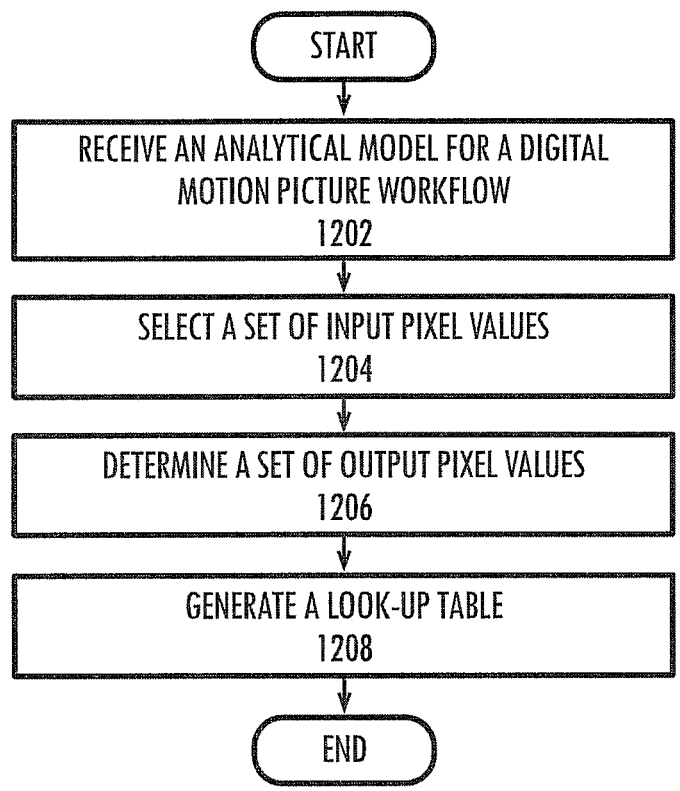
FIG. 12 presents a flowchart that illustrates a process for generating a look-up table based at least in part on an analytical model in accordance with one or more embodiments.

FIG. 12 presents a flowchart that illustrates a process for generating a look-up table based at least in part on an analytical model in accordance with one or more embodiments, although the scope of claimed subject matter is not limited in this respect. Although the procedure shown in FIG. 12 may comprise one particular order of blocks, the order in which the blocks are presented does not necessarily limit claimed subject matter to any particular order. Likewise, intervening blocks and/or additional blocks not shown in FIG. 12 may be employed and/or blocks shown in FIG. 12 may be eliminated, without departing from the scope of claimed subject matter.

The process shown in FIG. 12 may begin by receiving an analytical model for a digital motion picture workflow (step 1202). Next, the system may select a set of input pixel values (step 1204). In one particular example, although claimed subject matter is not limited in this respect, the system may select 32×32×32=32,768 pixel values, wherein each pixel value may comprise a combination of three color channel values, and wherein each color channel value may be selected from a range of 32 values.

The system may then determine a set of output pixel values based at least in part on the set of input pixel values and the analytical model (step 1206). Finally, the system may generate a look-up table by associating the set of input pixel values with the set of output pixel values (step 1208).

In one particular example, although claimed subject matter is not limited in this respect, the input pixel values may be in DPX format, whereas the output pixel values may be encoded in the CIELAB color space. Further, the look-up table may be represented and/or stored using a number of datastructures and/or formats. Specifically, in one particular example, although claimed subject matter is not limited in this respect, the look-up table may be represented and/or stored using an ICC (International Color Consortium) profile.

In one particular example, although claimed subject matter is not limited in this respect, the look-up table has 32,768 elements which may be stored in a 3-dimensional datastructure with 32 index values in each dimension. Each dimension of the look-up table may correspond to a color channel.

Figure 12A:
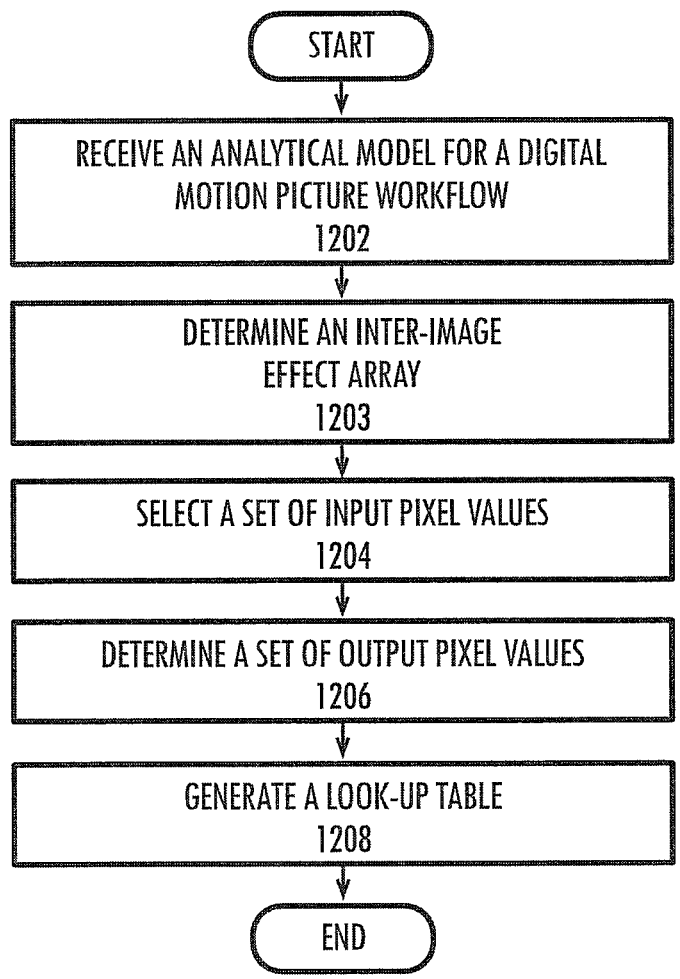
FIG. 12A presents a flowchart that illustrates a process for generating a look-up table based at least in part on an analytical model incorporating an inter-image effect array capable of tuning an effect of spectral dye density curves in accordance with one or more embodiments.

FIG. 12A presents a flowchart that illustrates a process for generating a look-up table based at least in part on an analytical model incorporating an inter-image effect array capable of tuning an effect of spectral dye density curves in accordance with one or more embodiments, although the scope of claimed subject matter is not limited in this respect. Although the procedure shown in FIG. 12A may comprise one particular order of blocks, the order in which the blocks are presented does not necessarily limit claimed subject matter to any particular order. Likewise, intervening blocks and/or additional blocks not shown in FIG. 12A may be employed and/or blocks shown in FIG. 12A may be eliminated, without departing from the scope of claimed subject matter.

The process shown in FIG. 12A may begin by receiving an analytical model for a digital motion picture workflow (step 1202). Next, an inter-image effect array 932 may be determined based at least in part on an analytical model and then incorporated into the analytical model (step 1203). Next, the system may select a set of input pixel values (step 1204). The system may then determine a set of output pixel values based at least in part on the set of input pixel values and the analytical model incorporating inter-image effect array 932 (step 1206). Finally, the system may generate a look-up table by associating the set of input pixel values with the set of output pixel values (step 1208).

Process for Previewing Digital Picture Content

Figure 13:
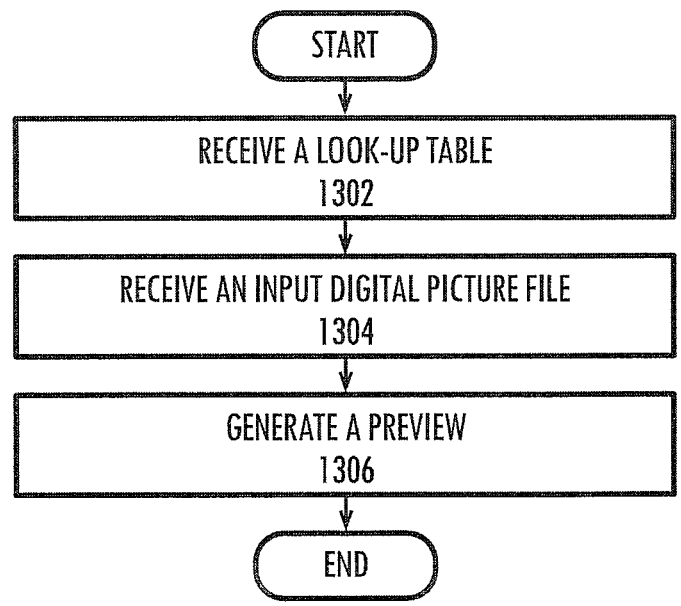
FIG. 13 presents a flowchart that illustrates a process for previewing digital motion picture content using a look-up table in accordance with one or more embodiments.

FIG. 13 presents a flowchart that illustrates a process for previewing digital picture content using a look-up table in accordance with one or more embodiments, although the scope of claimed subject matter is not limited in this respect. Although the procedure shown in FIG. 13 may comprise one particular order of blocks, the order in which the blocks are presented does not necessarily limit claimed subject matter to any particular order. Likewise, intervening blocks and/or additional blocks not shown in FIG. 13 may be employed and/or blocks shown in FIG. 13 may be eliminated, without departing from the scope of claimed subject matter.

The process shown in FIG. 13 may begin by receiving a look-up table which may have been generated based at least in part on an analytical model for a digital motion picture workflow (step 1302). Next, the system may receive an input digital picture file that contains digital picture content (step 1304). The system may then generate a preview of the digital picture content based at least in part on the pixel values in the input digital picture file and the look-up table (step 1306).

In one particular example, although claimed subject matter is not limited in this respect, the system may generate the preview by performing a 3-dimensional look up based at least in part on the three color channel values associated with a pixel in the input digital picture file.

The system may generate the preview by directly using the analytical model, instead of first generating a look-up table, and then using the look-up table to generate the preview. Specifically, the system may receive an analytical model. Next, the system may generate a preview of the digital picture content based at least in part on the pixel values in the input digital picture file and the analytical model.

Finally, one or more embodiments may not require time consuming and labor intensive manual operations, such as, processing films and measuring densities. Further, the analytical model may generate consistent and accurate results because it does not use measuring instruments and film processing techniques that usually introduce variations and noise. Finally, the analytical model may be flexible, e.g., if one stage in the motion picture workflow is modified, only the corresponding component in the analytical model needs to be modified, instead of modification of the entire analytical model.

Figure 15:
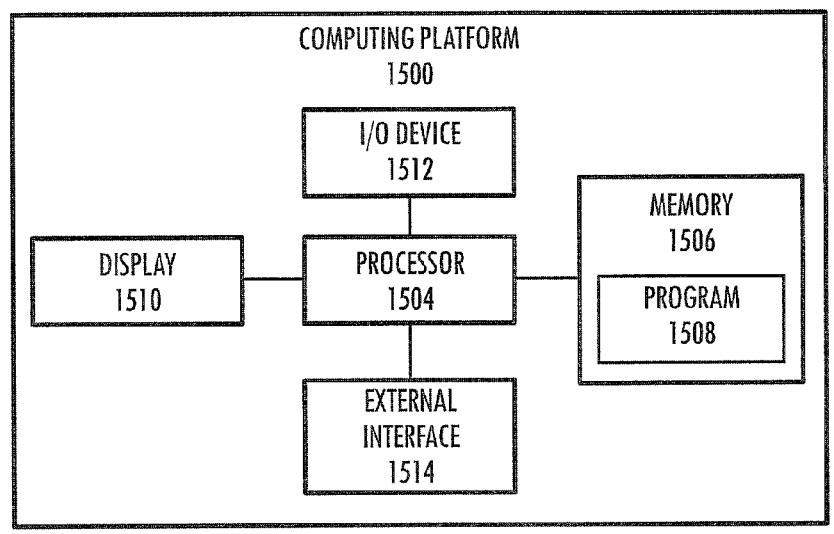
FIG. 15 is a schematic diagram of a computing platform in accordance with one or more embodiments.

Referring to FIG. 15, a block diagram illustrates a computing platform 1500 according to one or more embodiments, although the scope of claimed subject matter is not limited in this respect. Computing platform 1500 may include more and/or fewer components than those shown in FIG. 15. However, generally conventional components may not be shown, for example, a battery, a bus, and so on.

Computing platform 1500, as shown in FIG. 15 may be utilized to tangibly embody a computer program and/or graphical user interface by providing hardware components on which the computer program and/or graphical user interface may be executed. Computing platform 1500 may be utilized to tangibly embody all or a portion of the procedures of FIG. 11, FIG. 12, FIG. 12A, and/or FIG. 13, for example. Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 15, computing platform 1500 may be controlled by processor 1504, including one or more auxiliary processors (not shown). Processor 1504 may comprise a central processing unit such as a microprocessor or microcontroller for executing programs, performing data manipulations, and controlling the tasks of computing platform 1500. Auxiliary processors may manage input/output, perform floating point mathematical operations, manage digital signals, perform fast execution of signal processing algorithms, operate as a back-end processor and/or a slave-type processor subordinate to processor 1504, operate as an additional microprocessor and/or controller for dual and/or multiple processor systems, and/or operate as a coprocessor and/or additional processor. Such auxiliary processors may be discrete processors and/or may be arranged in the same package as processor 1504, for example, in a multicore and/or multithreaded processor; however, the scope of claimed subject matter is not limited in these respects.

Communication with processor 1504 may be implemented via a bus (not shown) for transferring information among the components of computing platform 1500. A bus may include a data channel for facilitating information transfer between storage and other peripheral components of computing platform 1500. A bus further may provide a set of signals utilized for communication with processor 1504, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of claimed subject matter is not limited in this respect.

Other components of computing platform 1500 may include, for example, memory 1506, including one or more auxiliary memories (not shown). Memory 1506 may provide storage of instructions and data for one or more programs 1508 to be executed by processor 1504, such as all or a portion of the procedures of FIG. 11, FIG. 12, FIG. 12A, and/or FIG. 13, for example. Memory 1506 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 1506 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecularbased memory such as polymer-based memories, and/or the like. Auxiliary memories may be utilized to store instructions and/or data that are to be loaded into memory 1506 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 1500 further may include a display 1510. Display 1510 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 1510 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 1500 further may include one or more I/O devices 1512. I/O device 1512 may comprise one or more I/O devices 1512 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 1500 further may include an external interface 1514. External interface 1514 may comprise one or more controllers and/or adapters to prove interface functions between multiple I/O devices 1512. For example, external interface 1514 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices 1512.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:

receiving a digital picture file of a film video that is modeled to determine how the film video will appear on-screen before the film video is developed;

estimating initial pixel values of an inter-image effects array that is utilized with an analytical model to tune effects of spectral dye density curves to determine output pixel values of the digital picture file;

determining the output pixel values based, at least in part, on the initial pixel values and the inter-image effects array with the analytical model that comprises:

modeling the digital picture file to determine a spectral exposure of a negative film for the film video;

modeling a recorder light spectrum of a recorder that is used to record the negative film based on the spectral exposure to determine a spectral transmittance of the negative film;

modeling printing data that represents the negative film printed onto a positive film to determine a printer light spectrum;

modeling a spectral transmittance of the positive film based on the printer light spectrum;

modeling a film projector to determine a spectral power distribution of projector light that projects the positive film as the film video on-screen; and generating a digital preview of the film video based on a look-up table of the output pixel values that are said determined with the analytical model.

2. The method of claim 1, further comprising:

said estimating the initial pixel values of the inter-image effects array based on the spectral dye density curves associated with a substrate of the film video, wherein the inter-image effects array comprises a three-by-three matrix; and adjusting the estimated initial pixel values based at least in part on behavior of a quality metric associated with the output pixel values.

3. The method of claim 2, wherein said estimating the initial pixel values further comprises estimating the initial pixel values independently of cross-talk effects between two or more color channels represented in the substrate.

4. The method of claim 2, wherein said determining the output pixel values further comprises applying the estimated initial pixel values to log values of captured exposure of the substrate in one or more color channels represented in the substrate.

5. The method of claim 1, wherein the positive film is a color positive film and said determining the output pixel values further comprises the analytical model modeling a behavior of the color positive film.

6. The method of claim 5, wherein said determining the output pixel values includes said modeling the behavior of the color positive film comprising:

determining log values of captured exposure of one or more color channels represented in the color positive film;

determining adjusted log values of captured exposure based at least in part on applying the estimated initial pixel values to the log values of the captured exposure; and determining dye values based at least in part on applying one or more characteristic curves to the adjusted log values of the captured exposure.

7. The method of claim 5, wherein said determining the output pixel values includes said modeling the behavior of the color positive film comprising:
- determining log values of captured exposure of one or more color channels represented in the color positive film;
- determining adjusted log values of captured exposure based at least in part on applying the estimated initial pixel values to the log values of the captured exposure;
- determining dye values based at least in part on applying one or more characteristic curves to the adjusted log values of the captured exposure; and
- determining a spectral transmittance of the color positive film based at least in part on the dye values.

8. The method of claim 1, wherein said determining the output pixel values further comprises:
- modeling a recorder behavior of the recorder capable of recording visual information expressed in the digital picture file onto a color negative film;
- modeling a negative film behavior of the color negative film in response to the color negative film being exposed to light by the recorder;
- modeling a printer behavior of a printer capable of printing the visual information expressed in the color negative film onto a color positive film;
- modeling a positive film behavior of the color positive film in response to the color positive film being exposed to light by the printer; and
- modeling a projector behavior of a projector capable of projecting the visual information represented in the color positive film.

9. The method of claim 2, wherein the quality metric comprises a model error based at least in part on a comparison between at least one of the output pixel values and one or more known pixel values, and wherein said adjusting the estimated initial pixel values further comprises adjusting the estimated initial pixel values based at least in part on a reduction in model error.

10. The method of claim 1, further comprising:
- generating the look-up table based at least in part on associating the initial pixel values with the output pixel values; and
- generating the digital preview of the film video based at least in part on the look-up table.

11. A computer-readable storage media device comprising an analytical model stored as instructions that are executable and, responsive to execution of the instructions by a computing device, the computing device performs operations of the analytical model comprising to:
- receive a digital picture file of a film video that is modeled to determine how the film video will appear on-screen before the film video is developed;
- estimate initial pixel values of an inter-image effects array that is utilized with an analytical model to tune effects of spectral dye density curves to determine output pixel values of the digital picture file;
- determine the output pixel values based, at least in part, on the initial pixel values and the inter-image effects array with the analytical model;
- model the digital picture file to determine a spectral exposure of a negative film for the film video;
- model a recorder light spectrum of a recorder that is used to record the negative film based on the spectral exposure to determine a spectral transmittance of the negative film;
- model printing data that represents the negative film printed onto a positive film to determine a printer light spectrum;
- model a spectral transmittance of the positive film based on the printer light spectrum;
- model a film projector to determine a spectral power distribution of projector light that projects the positive film as the film video on-screen; and
- generate a digital preview of the film video based on a look-up table of the output pixel values that are determined with the analytical model.

12. The computer-readable storage media device of claim 11, wherein the computing device performs operations of analytical model further comprising to:
- estimate the initial pixel values of the inter-image effects array based on the spectral dye density curves associated with a substrate of the film video, wherein the inter-image effects array comprises a three-by-three matrix; and
- adjust the estimated initial pixel values based at least in part on behavior of a quality metric associated with the output pixel values.

13. The computer-readable storage media device of claim 12, wherein the initial pixel values are estimated independently of cross-talk effects between two or more color channels represented in the substrate.

14. The computer-readable storage media device of claim 12, wherein to determine the output pixel values, the computing device performs operations of the analytical model further comprising to apply the estimated initial pixel values to log values of captured exposure of the substrate in one or more color channels represented in the substrate.

15. The computer-readable storage media device of claim 11, wherein the positive film is a color positive film and to determine the output pixel values, the computing device performs operations of the analytical model further comprising to model a behavior of the color positive film.

16. The computer-readable storage media device of claim 15, wherein the to determine the output pixel values, the computing device performs operations of the analytical model further comprising to model the behavior of the color positive film comprising to:
- determine log values of captured exposure of one or more color channels represented in the color positive film;
- determine adjusted log values of captured exposure based at least in part on applying the estimated initial pixel values to the log values of the captured exposure; and
- determine dye values based at least in part on applying one or more characteristic curves to the adjusted log values of the captured exposure.

17. The computer-readable storage media device of claim 15, wherein to determine the one or more output pixel values, the computing device performs operations of the analytical model further comprising to model the behavior of the color positive film comprising to:
- determine log values of captured exposure of one or more color channels represented in the color positive film;
- determine adjusted log values of captured exposure based at least in part on applying the estimated initial pixel values to the log values of the captured exposure; and
- determine a spectral transmittance of the color positive film based at least in part on the dye values.

18. The computer-readable storage media device of claim 11, wherein to determine the one or more output pixel values, the computing device performs operations of the analytical model further comprising to:

model a recorder behavior of the recorder capable of recording visual information expressed in the digital picture file onto a color negative film;

model a negative film behavior of the color negative film in response to the color negative film being exposed to light by the recorder;

model a printer behavior of a printer capable of printing the visual information expressed in the color negative film onto a color positive film;

model a positive film behavior of the color positive film in response to the color positive film being exposed to light by the printer; and model a projector behavior of a projector capable of projecting the visual information represented in the color positive film.

19. The computer-readable storage media device of claim 12, wherein the quality metric comprises a model error based at least in part on a comparison between at least one of the output pixel values and one or more known pixel values, and wherein the computing device performs operations of the analytical model further comprising to adjust the estimated initial pixel values based at least in part on a reduction in model error.

20. The computer-readable storage media device of claim 11, wherein the computing device performs operations of the analytical model further comprising to:

generate the look-up table based at least in part on associating the input pixel values with the output pixel values; and a generate the preview of the film video based at least in part on the look-up table.

21. An apparatus, comprising:

a computing platform comprising a processor system to implement an analytical model that models a digital picture file of a film video to determine how the film video will appear on-screen before the film video is developed, the analytical model configured to:

estimate initial pixel values of an inter-image effects array that is utilized with the analytical model to tune effects of spectral dye density curves to determine output pixel values of the digital picture file, the output pixel values based, at least in part, on the initial pixel values and the inter-image effects array;

model the digital picture file to determine a spectral exposure of a negative film for the film video;

model a recorder light spectrum of a recorder that is used to record the negative film based on the spectral exposure to determine a spectral transmittance of the negative film;

model printing data that represents the negative film printed onto a positive film to determine a printer light spectrum;

model a spectral transmittance of the positive film based on the printer light spectrum;

model a film projector to determine a spectral power distribution of projector light that projects the positive film as the film video on-screen; and generate a digital preview of the film video based on a look-up table of the output pixel values that are determined with the analytical model.

22. The apparatus of claim 21, wherein the analytical model is configured to:

estimate the initial pixel values of the inter-image effects array based on the spectral dye density curves associated with a substrate of the film video, the inter-image effects array comprising a three-by-three matrix; and adjust the estimated initial pixel values based at least in part on behavior of a quality metric associated with the output pixel values.

23. The apparatus of claim 22, wherein the initial pixel values are estimated independently of cross-talk effects between two or more color channels represented in the substrate.

24. The apparatus of claim 22, wherein to determine the output pixel values, the analytical model is configured to apply the estimated initial pixel values to log values of captured exposure of the substrate in one or more color channels represented in the substrate.

25. The apparatus of claim 21, wherein to determine the output pixel values, the analytical model is configured to:

model a recorder behavior of the recorder capable of recording visual information expressed in the digital picture file onto a color negative film;

model a negative film behavior of the color negative film in response to the color negative film being exposed to light by the recorder;

model a printer behavior of a printer capable of printing the visual information expressed in the color negative film onto a color positive film;

model a positive film behavior of the color positive film in response to the color positive film being exposed to light by the printer; and model a projector behavior of a projector capable of projecting the visual information represented in the color positive film.

26. The apparatus of claim 22, wherein the quality metric comprises a model error based at least in part on a comparison between at least one of the output pixel values and one or more known pixel values, and wherein the analytical model is configured to adjust the estimated initial pixel values based at least in part on a reduction in model error.

27. The apparatus of claim 21, wherein the analytical model is configured to:

generate the look-up table based at least in part on associating the input pixel values with the output pixel values; and a generate the digital preview of the film video based at least in part on the look-up table.

* * * * *

UNITED STATES PATENT AND TRADEMARK OFFICE
CERTIFICATE OF CORRECTION

PATENT NO. : 8,654,192 B2
APPLICATION NO. : 11/842630
DATED : February 18, 2014
INVENTOR(S) : Lars U. Borg Page 1 of 1

It is certified that error appears in the above-identified patent and that said Letters Patent is hereby corrected as shown below:

In the Claims

Column 21, Line 30, before "generate" delete "a", therefor.
Column 22, Line 53, before "generate" delete "a", therefor.

Signed and Sealed this
Thirteenth Day of May, 2014

Michelle K. Lee
*Deputy Director of the United States Patent and Trademark Office*